United States Patent
Cao et al.

(10) Patent No.: US 7,660,706 B2
(45) Date of Patent: Feb. 9, 2010

(54) METHOD AND APPARATUS FOR ALLOCATING LINK BANDWIDTH AS FUNCTION OF QOS REQUIREMENT

(75) Inventors: Jin Cao, Edison, NJ (US); William S. Cleveland, Summit, NJ (US); Don X Sun, Warren, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1002 days.

(21) Appl. No.: 10/783,806

(22) Filed: Feb. 20, 2004

(65) Prior Publication Data

US 2004/0181573 A1 Sep. 16, 2004

Related U.S. Application Data

(60) Provisional application No. 60/455,030, filed on Mar. 13, 2003.

(51) Int. Cl.
*G06F 17/10* (2006.01)
(52) U.S. Cl. .............................................. 703/2; 703/13
(58) Field of Classification Search .................. 703/13, 703/2; 370/395.21
See application file for complete search history.

(56) References Cited

U.S. PATENT DOCUMENTS 5,812,526 A * 9/1998 Chang et al. ................ 370/230

OTHER PUBLICATIONS

Cao et al, "Internet Traffic: Statistical Multiplexing Gains", Feb. 2002, Dimacs Internet Workshop 2002, 2 Pages.*

* cited by examiner

*Primary Examiner*—Paul L Rodriguez
*Assistant Examiner*—Luke Osborne
(74) *Attorney, Agent, or Firm*—John Ligon

(57) ABSTRACT

A method is provided for determining a bandwidth allocation needed to provide a specified QOS requirement that takes appropriate account of statistical variations for packet streams in a transmission link. In particular, a statistical model of the packet stream is formed using fractional sum difference statistical models and the model is evaluated in respect to synthetically generated traffic streams. The bandwidth allocation approach is specified in terms of the bandwidth, $\beta$, required for a traffic load, $\tau$, subject to the requirements of a maximum queuing delay, $\delta$, and a packet loss limitation parameter, $\omega$. Accordingly, that bandwidth allocation approach is implemented as a statistical model for $\beta$ as a function of $\tau$, $\delta$ and $\omega$.

12 Claims, 6 Drawing Sheets

METHOD AND APPARATUS FOR ALLOCATING LINK BANDWIDTH AS FUNCTION OF QOS REQUIREMENT

RELATED APPLICATION

This application claims priority pursuant to 35 U.S.C. Sec 119(e) to U.S. Provisional Application No. 60/455,030, filed Mar. 13, 2003, entitled METHOD AND APPARATUS FOR ALLOCATING BANDWIDTH TO A LINK OF A COMMUNICATIONS NETWORK AS FUNCTION OF QOS REQUIREMENT, the subject matter thereof being fully incorporated by reference herein.

FIELD OF THE INVENTION

The invention relates generally to network resource allocation methods, and particularly to the allocation of bandwidth for links of a communications network.

BACKGROUND OF THE INVENTION

A fundamental problem of Internet traffic engineering is that of determining the bandwidth (bits/sec), or link speed, required to carry a traffic load (bits/sec) offered to a given transmission link, and to satisfy specified quality-of-service (QoS) requirements for the offered traffic. The offered load is comprised of packets of varying sizes arriving for transmission on the link. Arriving packets can queue up at an input buffer for the link, and are dropped if the queue size (in bits) is larger than the input buffer size (in bits). Exemplary QoS metrics for the arriving packets are queuing delay and packet loss.

The bandwidth required to satisfy a specified QoS requirement (hereafter sometimes referred to as the "QoS bandwidth") depends on the queue-length process which, in turn, depends heavily on the statistical properties of the packet arrivals and sizes. These statistical properties also change as the mean connection load changes. Because of this statistical variation, the bandwidth allocation methods of the art have often produced sub-optimal bandwidth allocation.

SUMMARY OF THE INVENTION

A method is provided for determining a bandwidth allocation to provide a specified QOS requirement that takes appropriate account of statistical variations for packet streams in a transmission link. In particular, the method of the invention forms a statistical model of the packet stream using fractional sum difference statistical models and evaluates that model in respect to synthetically generated traffic streams. The bandwidth allocation approach of the invention is specified in terms of the bandwidth, $\beta$, required for a traffic load, $\tau$, subject to the requirements of a maximum queuing delay, $\delta$, and a packet loss limitation parameter, $\omega$. Accordingly, that bandwidth allocation approach is implemented as a statistical model for $\beta$ as a function of $\tau$, $\delta$ and $\omega$.

In a further embodiment of the invention, an algorithm is determined from the statistical model so developed for specifying the QOS bandwidth needed in a given application and for a given transmission link.

DETAILED DESCRIPTION OF THE INVENTION

Figure 1:
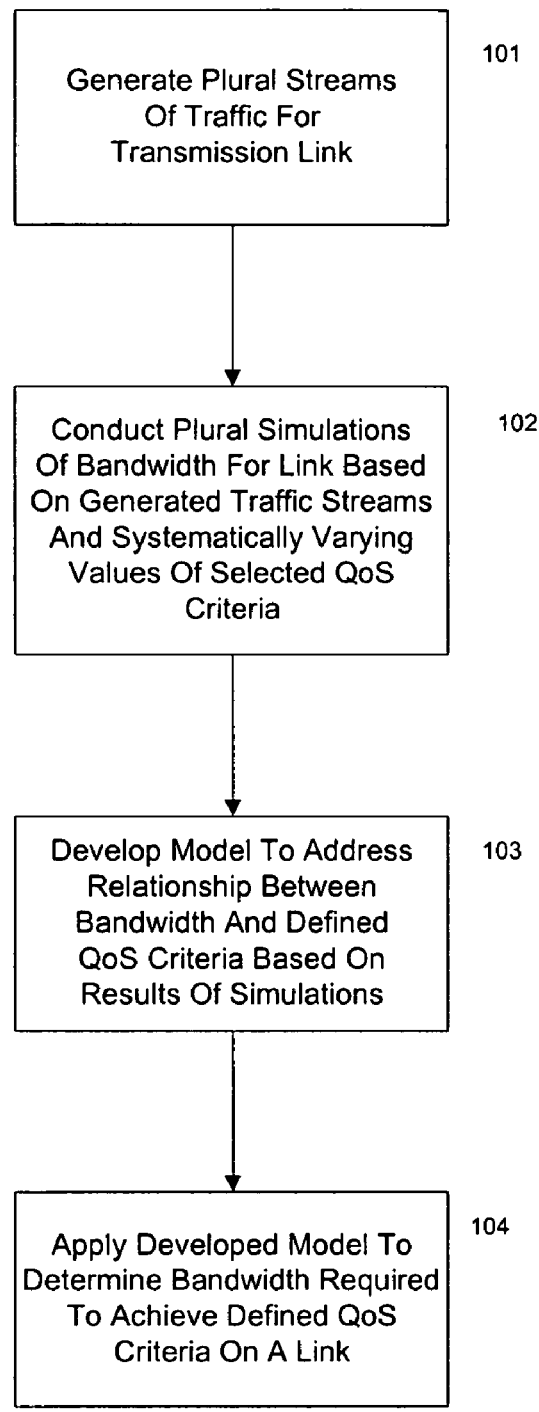
FIG. 1 provides a flow chart directed to the bandwidth allocation method of the invention.

The invention disclosed herein is directed to bandwidth allocation for links of a communication network. In particular, the invention provides an improved methodology for determining what link bandwidth is needed for a given traffic bit rate to ensure that the transmission on the link maintains a defined QoS. It is noted that the inventors have authored a companion article to the disclosure of the invention herein, which may be useful as a source of background detail or for additional information respecting the fractional sum difference statistical models used in the development of the invention (as discussed more fully below). That article, entitled "Bandwidth Estimation For Best-Effort Internet Traffic," *Statistical Science*, 2004, Vol. 19, No. 3, pp 518-543 is hereby incorporated by reference herein.

Although the bandwidth allocation methodology of the invention will be useful in any communications network connection between a sending and a receiving terminal, it is expected to find particular application in the allocation of bandwidth on Internet links with aggregate traffic, and such an application will be described hereafter as an illustrative embodiment of the invention. As a preface to the further description of the invention, the characteristics and parameters of such an Internet connection are first briefly considered.

The traffic on an Internet link usually arises from connections between pairs of computers. For each connection between a source and a destination computer, the information to be sent (typically a file comprising a number of bits or bytes) is broken up into packets at the source computer. The packets are sent from the source computer to the destination computer where they are reassembled to form the original file.

In traversing the connection between the source and destination computers, the packets travel along a communications path across the Internet that consists of transmission links and routers. The source computer is connected to a first router by a transmission link; the first router is connected to a second router by another transmission link, and so forth. A router has input links and output links. When it receives a packet from one of its input links, it reads the destination address of the packet, determines which of the routers connected to it by output links should get the packet, and sends out the packet over the output link connected to that router. That process continues for each router in the connection with the final router sending the packet out on a link directed to the destination computer.

At any given time, there are a number of simultaneous active connections using a given transmission link. The packets of the different connections are intermingled on the link; for example, if there are three active connections, the arrival order of 10 consecutive packets by connection number might be 1, 1, 2, 3, 1, 1, 3, 3, 2, and 3. The packet intermingling is characterized as statistical multiplexing. Note also that links closer to either end of a connection are generally characterized by lower link speeds and fewer connections, while links traversing the network core are generally characterized by higher link speeds and more connections.

With the understanding that the number of connections using a given link varies over a time interval, a mean connection load over a stationary interval can be defined, which is designated herein as c. This mean connection load represents the average number of active connections using the link over a defined time interval.

Another important traffic metric is the mean traffic bit rate over a stationary interval. That metric is determined by an evaluation of every packet arrival during a defined interval, including a determination of the size (in bits/bytes) for each arriving packet. The sum of the arriving packet sizes is then divided by the number of packets to arrive at a mean packet size (number of bits) in the interval. That mean packet size is multiplied by the packet rate for the interval to arrive at an average bit rate (bits/sec) on the link during that interval. That mean traffic bit rate is designated herein as $\tau$. (Alternatively, $\tau$ can be computed as the sum of the packet sizes arriving in the interval divided by the interval length.)

Note that as the number of active connections on a link increases, $\tau$ tends to increase—i.e., as c increases, $\tau$ tends to increase.

When a packet arrives for transmission on a link, it is presented with a queuing mechanism, usually going into a buffer having a given capacity. From the buffer, the bits of the packet are put onto the link. The link has a fixed speed or bandwidth, $\beta$ (bits/sec). The bits of a packet are put on the link at rate $\beta$. As will be apparent, the link bandwidth, $\beta$, must be larger than the mean traffic bit rate $\tau$. Accordingly, as $\tau$ increases (often in association with an increase in the average number of connections on a link (c)) the link bandwidth will also generally need to increase.

If, when a packet arrives, other packets are already in the buffer awaiting transmission, then the arriving packet has to also wait for transmission. The time the packet must wait before it is actually transmitted on the link is characterized as packet delay and designated here as $\delta$ (sec). Once the packet reaches the top of the queue (i.e., ready for transmission), the time required for transmission of the packet from the buffer onto the link is called the service time.

Note also that, upon arrival of a new packet, if the buffer is full, the arriving packet is dropped. Both queuing delay and packet drops degrade the QoS of the traffic and one or more of these factors is often applied for defining acceptable QoS for a link.

The QoS achieved on a link—particularly as related to delays and drops on the link—is closely linked to the traffic loading relative to the traffic capacity, or bandwidth, of the link. Stated differently, an increase in bandwidth for a given traffic load decreases service time, which reduces queuing delay and number of drops (and vice versa). Accordingly, poor QoS resulting from delays and drops on a link can be improved by increasing the link bandwidth. Note, as well, that loss and delay are also affected by the buffer size, and therefore that an increase in the buffer size will reduce the number of dropped packets. However, the queuing delay has the potential to increase with such an increase in buffer size.

It should thus be apparent that a basic problem in bandwidth allocation is to choose the link bandwidth, $\beta$, to satisfy the QoS criteria. The value of $\beta$ so chosen is designated herein as the QoS bandwidth. A related parameter, utilization of a link (defined as: $u=\tau/\beta$) represents the fraction of the capacity of the link that is used on average. Since a router cannot transmit traffic faster than the link bandwidth, $\beta$, the link traffic rate, $\tau$, must be less than or equal to $\beta$ in order to prevent major QoS problems. The QoS utilization then is the value of u determined as a function of the QoS bandwidth.

The general bandwidth allocation problem can then be characterized as either:

(1) What traffic load $\tau$ can be put on a link with a specified bandwidth $\beta$ while maintaining a given QoS criteria; or (2) What link bandwidth $\beta$ is needed for a specified traffic load $\tau$ in order to maintain the QoS criteria.

For the illustrative embodiment of the invention described herein, the bandwidth allocation methodology of the invention is described in the context of Internet "best effort" traffic. It is noted, however, that the invention is intended to encompass an application of that methodology to other categories of traffic that are transmitted across a network.

Note also that the heretofore-described delay and loss QoS criteria are applied in the development of the illustrative embodiment. It should, however, also be apparent that other QoS criteria could be used, and one skilled in the art will readily understand such alternate QoS applications from the description herein of the invention.

For delay, two metrics are used: a target maximum delay, $\delta$, and the delay probability, $\omega$ (i.e., the probability that packet delay will exceed the target maximum delay). With respect to packet loss, it is assumed that a buffer size is chosen large enough that packet drops will be negligible—an assumption consistent with the current practice of service providers on their core links. To address the problem of a large buffer size potentially leading to an increase in delay, appropriate limits are established for the maximum delay, $\delta$, and delay probability, $\omega$ in the formulation of the methodology of the invention.

For purposes of the description of the invention herein, a packet stream should be understood to consist of a sequence of arriving packets, each with a size. The arrival number for the arriving packets will be denoted herein by v (v=1 signifying the first arriving packet, v=2 the second packet, and so forth). The packet arrival times will then be designated by $a_v$, and the inter-arrival times designated by $t_v = a_{v+1} - a_v$. Finally, the notation $q_v$ will be used to denote the size of the packet arriving at time $a_v$.

The QoS bandwidth for a packet stream depends on the queue-size time process, and the queue-size time process depends on the statistical properties of $t_v$ and $q_v$. Accordingly, the statistical properties of the packet stream will be described herein by the statistical properties of $t_v$ and $q_v$ as time series in v.

It is known that best-effort Internet traffic has long-range dependent $t_v$ and $q_v$, but as the mean connection load, c, increases, the arrivals tend toward Poisson and the sizes tend toward independence. Relatedly, persistent, long-range dependent $t_v$ and $q_v$ have larger queue-size distributions than those for independent $t_v$ and $q_v$ (Citations to research in support of these propositions can be found in the companion cross-referenced paper for the reader wishing to pursue such).

It is also known to those skilled in the art that long-range dependent traffic is burstier than independent traffic, resulting in smaller QoS utilization because more headroom is needed to allow for the bursts. It therefore follows that the bandwidth allocation mechanism changes as the connection density, c, on a link changes because the statistical properties of $t_v$ and $q_v$ change—i.e., a "multiplexing gain" can be expected with higher utilization due to the reduction in dependence.

The bandwidth allocation methodology of the invention encompasses a modeling approach base on queuing simulation, and the steps of that methodology are illustrated in the flow chart of FIG. 1. As discussed above, the input to a queue is a packet stream defined by packet arrivals and sizes, and the methodology begins at step 101 with generation of a plurality of such streams (20 streams in the illustrative embodiment described herein). Each input stream has a traffic bit rate $\tau$, and a set of packet streams is chosen so that $\tau$ varies over a wide range. As shown in step 102, many simulations are run for each stream, with systematically varying delays, $\delta$, and delay probabilities, $\omega$. For each simulation, the QoS bandwidth, $\beta$, is determined for the fixed values of $\tau$, $\delta$ and $\omega$. With the data from the simulations, and using known characteristics for queuing systems, a hierarchical statistical model is developed in step 103 (as described more particularly hereafter) that relates the QoS bandwidth to $\tau$, $\delta$ and $\omega$. Finally, at step 104, the developed model is applied to determine bandwidth required to achieve a defined QoS criteria on a link.

For a preferred embodiment of the invention, the packet streams are synthetically generated based on statistical models. Specifically, the synthetic packet streams are defined by arrivals and sizes generated by recently developed Fractional Sum Difference (FSD) statistical models for the $t_v$ and $q_v$ of best-effort traffic. A description of both the FSD model and the synthetic traffic streams developed therefrom is provided in Section 4 of the companion cross-referenced paper, which also includes citations to additional research regarding such FSD models for the reader wishing to pursue additional detail. Inasmuch as the synthetic packet streams so generated are derived using known techniques and are used only as an input parameter for the modeling process of the method of the invention (described hereafter), detailed discussion of the FSD model is not warranted here. A brief overview of the discussion in Section 4 of the cross-referenced paper may, however, be useful.

Synthetic packet streams generated by FSD statistical models have been found to provide an excellent fit for best-effort traffic, subject to the constraint that the number of connections per link (c) be above about 64 connections—a relatively small traffic load.

Because the packet inter-arrival times, $t_v$, and sizes, $q_v$, are both non-gaussian and long-range dependent, a transform is made to a new time series in v that is close to gaussian. Thus $t_v$ and $q_v$ are each transformed to new time series, $t_v^*$ and $q_v^*$, characterized as the sum of a gaussian long-range dependent time series and gaussian white noise.

The marginal distribution of $t_v$ is modeled by a Weibull with shape $\lambda$ and scale $\alpha$, a family with two unknown parameters. Estimates of $\lambda$ are almost always less than 1.

The marginal distribution of $q_v$ is modeled by a discrete-continuous distribution. The distribution is characterized by A atoms at sizes $\phi_1^{(s)} \ldots \phi_A^{(s)}$, representing commonly occurring packet sizes. The corresponding atom probabilities are $\phi_1^{(a)} \ldots \phi_A^{(a)}$. The continuous part of the distribution is piecewise uniform on C intervals over the range of packet sizes. The breaks occur at C−1 distinct values, $\phi_1^{(b)} \ldots \phi_{C-1}^{(b)}$, greater than the packet size at $\phi_1^{(s)}$ and less than the packet size at $\phi_S^{(s)}$, and the endpoints of the intervals are these values together with the packet size at $\phi_1^{(s)}$ and the packet size at $\phi_A^{(s)}$. The probabilities for the intervals are $\phi_1^{(i)} \ldots \phi_C^{(i)}$.

A synthetic packet stream is generated by specifying the following parameters: (1) A atom probabilities $\phi_i^{(a)}$ at A sizes $\phi_i^{(s)}$, C−1 break points $\phi_i^{(b)}$, and C interval probabilities $\phi_i^{(i)}$; (2) the packet rate per connection, $\gamma_p$; and (3) $\tau$.

It is noted that, in the initial formulation of the methodology of the invention, the inventors also used live traffic data in their modeling process as a validity check on the use of the generated synthetic traffic streams. Each of the live streams of traffic constituted measurements of arrivals and sizes from Internet links. The data bases from which the live traffic was obtained and the relevant parameters for that traffic are described in Section 5.1 of the companion cross-referenced paper. From the inventors' work with the live and synthetic traffic streams, it became clear that the FSD synthetic streams provide a close approximation to measured statistical properties of the live data. There are also advantages to the use of the synthetic stream data over live traffic data: (1) the synthetic data allow extrapolation to traffic bit rates for which no live data are yet available; and (2) the synthetic data provide greater accuracy than the live traffic because one can generate arbitrarily large packet streams which may be needed to derive particular relationships (an impossibility with live data which are non-stationary through time and therefore must be broken up into individual packet streams over short periods of time).

A synthetic trace database was constructed for application in the modeling methodology of the invention consisting of 20 traces, and each trace consisting of 20 million packets generated by the FSD statistical model. The 20 million packets-per-trace value was chosen so that the QoS utilizations for repeat runs of the simulation with the same synthetic traces and the same QoS criteria would differ by less than 0.005.

As discussed above, the generation of a synthetic stream requires the specification of the marginal distribution of the packet sizes $q_v$, the packet rate per connection $\gamma_p$, and the traffic bit rate $\tau$. In the illustrative embodiment described here those parameters are specified as follow. The size marginal distribution of all 20 synthetic traces was taken to be the empirical marginal distribution of a set of live traffic traces which appeared to be representative. While one could also specify a model from the discrete-continuous class described above, this somewhat simplifying approach was follow because the result is very nearly the same. The packet rate per connection, $\gamma_p$, was specified to be 1.5 packets/sec/connection; which was an average value experienced across all of the live traces evaluated by the inventors. 10 values of $\tau$ were specified, with 2 traces at each of these values. The smallest value used for this illustrative embodiment was approximately 1 megabit/sec, corresponding to the smallest bit rate in the live traces evaluated by the inventors. The 9 remaining values increase by successive powers of 2, so the largest value of $\tau$ is about 512 megabits/sec.

For each of the 20 synthetic traces generated as described above, each trace having a predetermined value of $\tau$, 25 runs were carried out for the illustrative embodiment, each with a particular queuing simulation. Specifically, for each run, a target delay $\delta$ and a delay probability $\omega$ were selected. Simulations were then run to find the QoS bandwidth $\beta$—i.e., the bandwidth that results in delay probability $\omega$ for the delay $\delta$. This also yields a QoS utilization $u=\tau/\beta$. In the illustrative embodiment 5 QoS delays (0.001 sec, 0.005 sec, 0.010 sec, 50 ms, 0.100 sec) and 5 QoS delay probabilities (0.001, 0.005, 0.01, 0.02, and 0.05) are used, and the 25 combinations of the two QoS delay criteria were distributed among the 25 runs for a given trace.

Each queuing simulation of a set of runs is characterized as follows:

the buffer is infinite;

the queuing discipline is first-in-first-out;

a trial QoS bandwidth is chosen;

the queuing delay at the arrival times of the packets is measured, which determines the queuing delay process;

from the queuing delay process the delay probability for the chosen a is found.

The simulation is iteratively repeated, changing the trial bandwidth, until the attained delay probability approximately matches the chosen delay probability ω. The optimization is straightforward because δ decreases as the trial bandwidth increases for fixed ω.

In the optimization, the utilization is capped at 0.97—i.e., if the true QoS utilization is above 0.97, it is set to 0.97. The reason for this cap on the utilization value is that a logistic scale, log(u/(1−u)), is used in the modeling of the data (as described below). Above about 0.97, the logistic scale becomes very sensitive to model mis-specification and the accuracy of the simulation, even though the utilizations above 0.97 are, for practical purposes, nearly equal. Similarly, the lower range of the utilization is limited to a minimum of 0.05.

The resulting data for each of the 20 synthetic streams includes 25 measurements, one per run, of each of three queuing variables: the QoS utilization u, the delay δ, and the delay probability ω. For the described illustrative embodiment, the range of δ is 0.001 sec to 0.100 sec, and the range of ω is 0.001 to 0.05. As already described, the range of the QoS utilization is 0.05 to 0.97. The additional variables that measure the statistical properties of the stream, such as τ, are constant across the 25 runs for each stream.

In the discussion hereafter of the data modeling according to the method of the invention, the following notation is used for the simulation data: $\delta_j$ for j=1 to 5 are the 5 values of the target delay and $\omega_k$ for k=1 to 5 are the 5 values of the delay probability. $u_{ijk}$ is the QoS utilization for delay $\delta_j$, delay probability $\omega_k$, and stream i, where i=1 to 20.

An objective of the method of the invention is to find an algebraic relationship to address the dependence between QoS utilization, u, and the heretofore-discussed QoS criteria: delay δ and the delay probability ω. To that end, a general model for that dependency relationship was formulated of the form:

$$f(u_{ijk}) = g_i(\delta_j, \omega_k) + \epsilon_{kij}$$

where f is a function of u and g is a function of δ and ω that can vary from stream to stream, and the $\epsilon_{ijk}$ are independent random errors with mean 0.

The inventors have determined that the function $\log_2(\delta)$ provides a logical scale for the delay, δ, and in an initial step for determining the dependency relationship, the conditional dependence of u on $\log_2(\delta)$, given ω and the stream, is considered.

Figure 2:
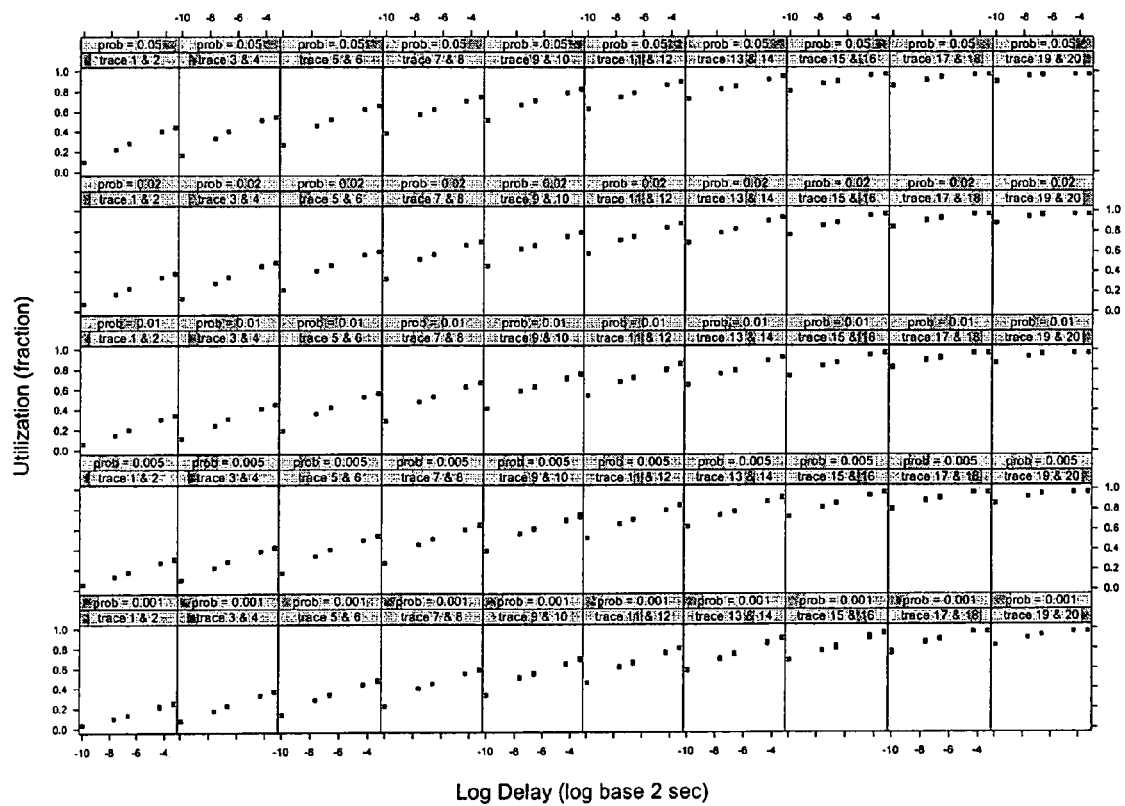
FIG. 2 shows a data distribution for modeling a bandwidth allocation model according to the invention.

A powerful method for the consideration of such conditional dependence is a trellis display—i.e., for each combination of delay probability $\omega_k$ and trace i, plot $u_{ijk}$ against $\log_2(\delta_j)$. Such a plot was developed for the 20 synthetic packet streams, which is shown in FIG. 2—utilization graphed against log delay ($\log_2(\delta)$), given delay probability, ω, and bit rate, τ. As will be seen in the figure, there are 50 panels divided into 10 rows and 5 columns. On each panel, $u_{ijk}$ is graphed against $\log_2(\delta_j)$ for one value of $\omega_k$ and for two streams with the same value of $\tau_i$. Note that the values of i and $\omega_k$ are shown in the strip labels at the top of the panel, and the value of $\tau_i$ for the two traces on the panel is given inside the panel. The $\tau_i$ are constant for all panels in a column, and increase as one moves left to right through the columns—in the leftmost column the value is about 1 megabit/sec and increases by a factor of 2 in each successive column moving left to right. The $\omega_k$ are constant for all panels in a row, and increase as one moves from bottom to top through the rows. There are 10 points per panel, 5 for each of the two streams. Because the utilizations are so close for the two streams of each panel, each pair of points for a specific value of $\log_2(\delta_j)$ typically appears as a single point.

A number of overall effects of τ, δ, and ω on u can be seen from FIG. 2. First, as noted above, there is little difference between the two sets of utilizations for each pair of streams with the same value of τ; in fact, the choice of a large sample size for the synthetic packet streams (20 million packets per stream), essentially ensured this result. Additionally, for each pair of values of ω and τ, there is an increase in u with increasing δ, a strong main effect in the data. There is also an increase with τ for fixed δ and ω, another strong main effect. A main effect for ω is also to be observed, but smaller in magnitude than for the other two variables. The dependence of u on $\log_2(\delta)$ is nonlinear, and changes substantially with the value of τ; as τ increases, the overall slope in u as a function of $\log_2(\delta)$ first increases and then decreases. In other words, there is an interaction between $\log_2(\delta)$ and τ.

From these effects observable in the trellis of FIG. 2, the inventors have determined that a logit function would provide a good fit to the data for the function of u in the general model of the dependency relationship shown above. Thus $$f(u) = logit_2(u) = \log_2\left(\frac{u}{1-u}\right).$$

Figure 3:
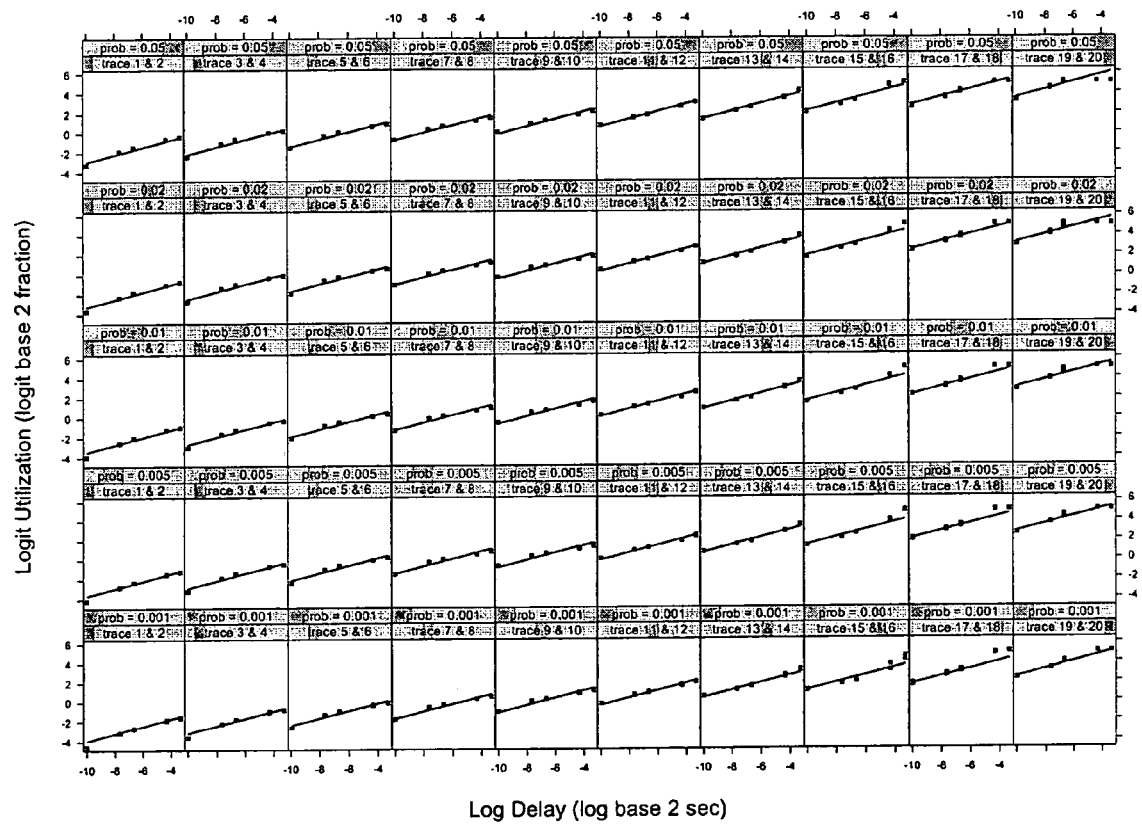
FIG. 3 shows a data distribution for modeling a refinement in that bandwidth allocation model.

FIG. 3 provides a plot of logit utilization ($logit_2(u_{ijk})$) against log delay ($\log_2(\delta_j)$), given delay probability, ω, and bit rate, τ, and using the same streams and layout as for FIG. 2. As can be seen, the logit function does an excellent job of simplifying the dependence. The dependence on $\log_2(\delta)$ is linear. There does not appear to be any remaining interaction among the three variables: $\log_2(\delta)$, τ, and ω. To help show this, 10 lines with different intercepts, but the same linear coefficient, have been drawn on the panels. The method of fitting will be described below. The lines provide an excellent fit. The only departure from the linear pattern occurs for the very highest values of τ and the higher values of δ. However, the effect, while appearing large on the logistic scale is nearly inconsequential on the utilization scale since it involves values of u close to 97%, the maximum for that parameter.

Figure 4:
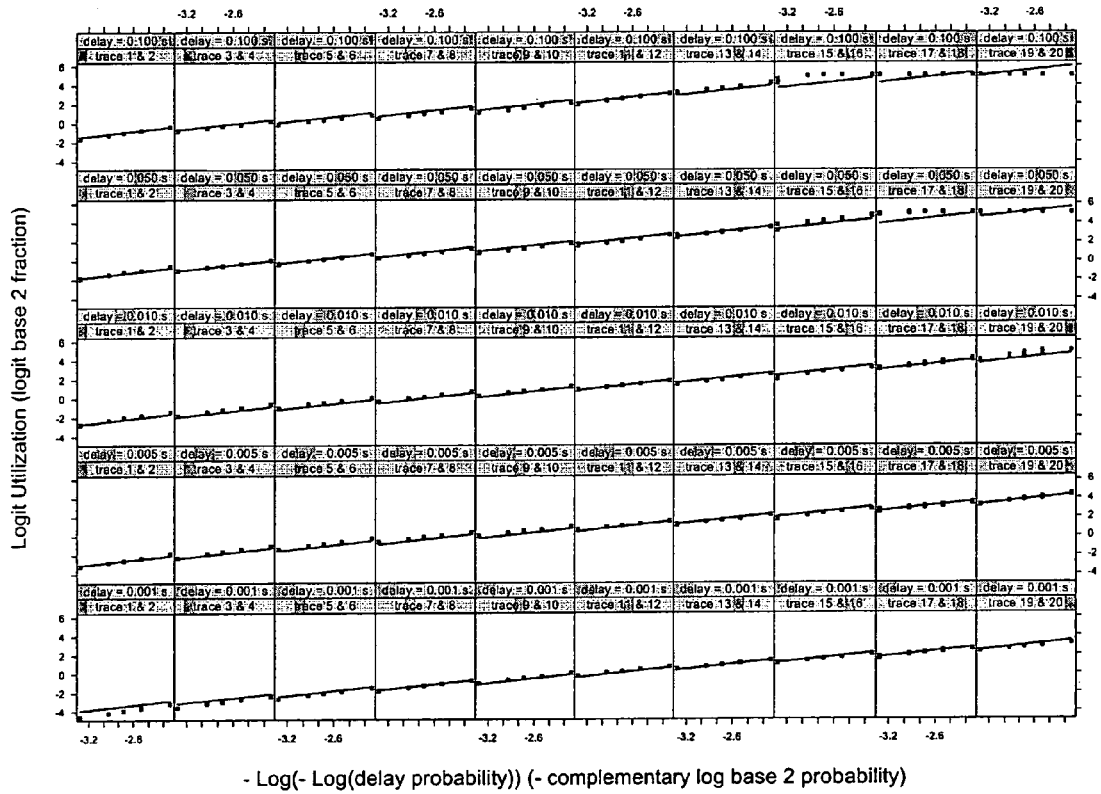
FIG. 4 shows a data distribution in respect to a further refinement in that bandwidth allocation model.

From consideration and extension of earlier work by Erlang in regard to delay probability (as described in Section 6.2 of the companion cross-referenced paper), the inventors hypothesized that the function of delay probability, ω, in the general model of the dependency relationship above, would be a term of the form $-\log_2(-\log_2(\omega))$, the negative complementary log of ω. The dependence of $logit_2(u)$ on $-\log_2(-\log_2(\omega))$ was then evaluated by use of trellis plots similar in design to those of FIG. 3. FIG. 4 shows those plots for the 20 synthetic streams. On each panel, logit utilization ($logit_2(u_{ijk})$) is graphed against the negative complementary log of the delay probability ($-\log_2(-\log_2(\omega))$) for one value of $\delta_j$ and for two streams with the same value of $\tau_i$. As will be seen from FIG. 4, the inventors' hypothesis is on target: $logit_2(u)$ is linear in $-\log_2(-\log_2(\omega))$, and the slope remains constant across streams and across different values of δ. To help show this, lines with the same linear coefficient but different intercepts have been drawn on the panels. As with FIG. 3, the method of fitting these lines will be described below. The lines provide an excellent fit except for the errant points for high utilizations observed earlier.

The heretofore described model building and empirical findings (as shown in FIGS. 3 and 4) shows that a very simple model relates the QoS utilization u to the QoS delay, δ, and the QoS delay probability, ω. That model, which is hereafter characterized as the FSD delay model, is:

$$\log_2\left(\frac{u}{1-u}\right) = \mu + o_\delta \log_2(\delta) + o_\omega(-\log_2(-\log_2(\omega))) + \epsilon, \quad (1)$$

where $\epsilon$ is a random variable with mean 0 and variance $\sigma^2(\epsilon)$ that expresses random error variability of the model for predicting utilization. The parameter $\mu$ in the model changes with the packet stream being modeled and serves as a summary of the statistical properties of the stream. Hereafter, the dependence of $\mu$ on the measured statistical properties of a stream such as $\tau$ will be considered.

The model, rewritten as an equation that describes the specifics of the data here, is:

$$\log_2\left(\frac{u_{ijk}}{1-u_{ijk}}\right) = \mu_i + o_\delta \log_2(\delta_j) + o_\omega(-\log_2(-\log_2(\omega_k))) + \epsilon_{ijk}, \quad (2)$$

where the $\epsilon_{ijk}$ are independent realizations of the random variable $\epsilon$.

Equation 2 was fitted to the data for the 20 synthetic packet streams in order to estimate the coefficients $\mu_i$, $o_\delta$ and $o_\omega$. Because of the outliers that occur at high utilizations, the fitting was carried out using the bisquare method of robust estimation. The estimates of $o_\delta$ and $o_\omega$ for the data are $o_\delta=0.379$ and $o_\omega=0.863$. The data fits are used in FIGS. 3 and 4, which show that the fitted equation lies very close to the data except for the small number of errant values. In other words, the FSD delay model provides an excellent fit to the data.

To model the random variable $\epsilon$, the statistical properties of the residuals—the departures of the $\text{logit}_2(u_{ijk})$ from the fitted equation—were considered. Except for a small fraction of errant residuals for high utilizations, $\epsilon$ is well approximated by a normal distribution. The variance was estimated robustly by 0.75 times the median absolute residual—i.e., $\sigma^2(\epsilon)=0.113$.

The coefficient $\mu$ in the FSD delay model of Equation 2 varies with the packet stream and reflects how the changing statistical properties of the streams affect the QoS utilization. Although the fact of a single numerical value $\mu$ characterizing how the statistical properties of a stream affect the QoS bandwidth is part of the simplicity of the model, the variation with packet stream necessitates a secondary modeling of $\mu$. Here, that modeling of $\mu$ as a function of packet stream statistical variables is considered. The end result is a hierarchical model for the QoS utilization: the first-level FSD delay model and a second-level model for $\mu$.

Based on deduction from the earlier referenced work of Erlang and consideration of changes in utilization, u, with change in connection density, $\tau$, as a function of both pure rate gain and multiplexing gain (as described in Section 7 of the companion cross-referenced paper), the inventors hypothesize that $\mu$ is linear in $\log_2(\tau)$. From this hypothesis, the second level model for $\mu$ is projected as:

$$\mu = o + o_\theta(\log_2(\tau)-24) + \xi \quad (3)$$

where $\xi$ is a random variable with mean 0 and variance $\sigma^2(\xi)$ that expresses random error variability of the model for predicting $\mu$. The predictor $\log_2(\tau)$ has been centered at 24 as the approximate center of the data values for the packet traces.

The model, rewritten as an equation that describes the specifics of that data, is $$\mu_i = o + o_\tau(\log_2(\tau_i)-24) + \xi_i \quad (4)$$

where the $\xi_i$ are independent realizations of $\xi$.

Figure 5:
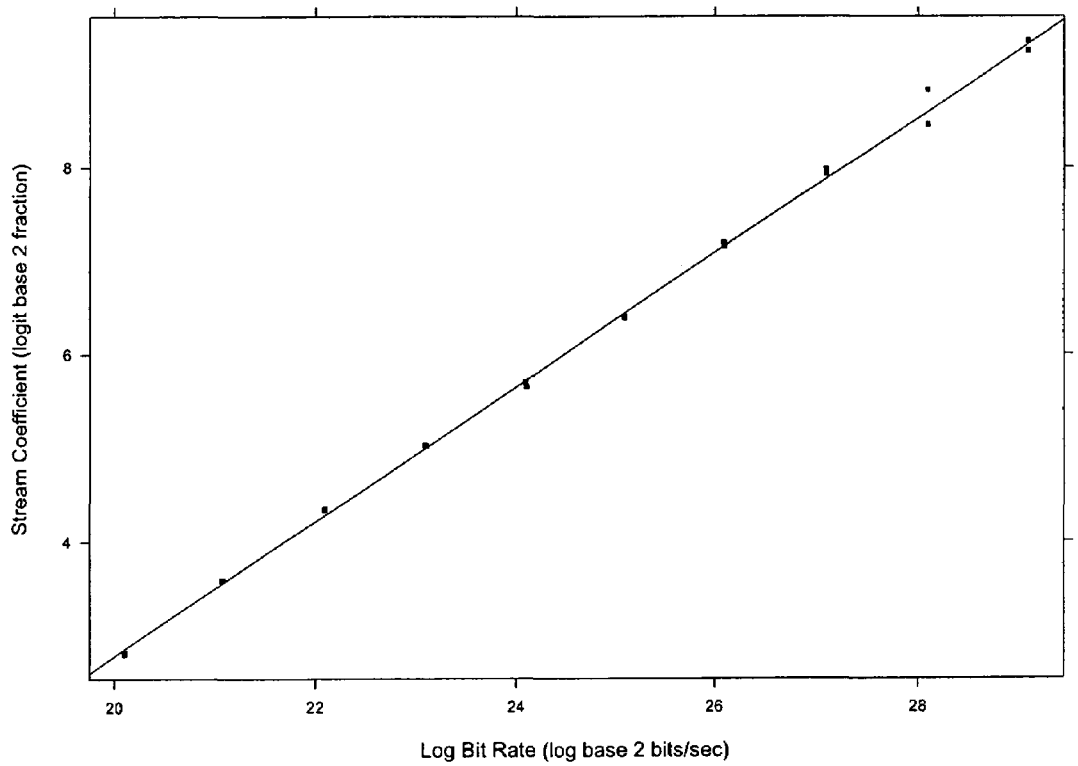
FIG. 5 shows a data distribution directed to a specification of a statistical parameter term for a bandwidth allocation model of the invention.

FIG. 5 provides a plot of the estimated stream coefficients $\hat{\mu}_i$ of the fitted FSD delay model against log bit rates ($\log_2(\tau_i)$) for the 20 synthetic packet streams. There are 20 points on the plot but the two results for each pair of streams with the same value of $\tau_i$ are so close that they appear on the plot as a single point. The dependence of $\hat{\mu}_i$ on $\log_2(\tau_i)$ is clearly linear, so the inventors' hypothesis is established.

The coefficients of Equation 3 were estimated by fitting it to the $\hat{\mu}_i$ and $\tau_i$ values using the bisquare method of robust estimation used above. The estimates for the synthetic packet streams are:

$\hat{o}=5.500$ and $\hat{o}_\tau=0.709$.

To model the random variable $\xi$, the statistical properties of the residuals—the departures of the $\hat{\mu}_i$ from the fitted equation, were evaluated. It was found that $\xi$ is well approximated by the normal distribution except a few errant traces with residuals large in absolute value. The standard deviation was estimated, as before, by 0.75 times the median absolute residual. That estimate is:

$\hat{\sigma}(\xi)=0.036$.

The FSD delay model of Equation 2 (first-level model) together with the second-level model in Equation 4 for $\mu$ (the stream coefficient model) together provide a hierarchical model for bandwidth allocation: predicting the QoS utilization, u, from $\delta$, $\omega$ and $\tau$. The model can be written in the form:

$$\text{logit}_2(u) = o + o_\tau \tau + o_{\delta \log 2}(\delta) + o_\omega(-\log_2(-\log_2(\omega))) + \psi, \quad (5)$$

where $\psi = \epsilon + \xi$ is a normal random variable with mean 0 and variance $\sigma^2(\psi) = \sigma^2(\epsilon) + \sigma^2(\xi)$ that expresses random error variability of the model for predicting u. The model, rewritten as an equation that describes the specifics of the data here, is:

$$\text{logit}_2(u_{ijk}) = o + o_\tau \tau_i + o_{\delta \log 2}(\delta_j) + o_\omega(-\log_2(-\log_2(\omega_k))) + \psi_{ijk} \quad (6)$$

The estimated values of the parameters from the synthetic packet trace data are:

$\hat{o}=5.500$, $\hat{o}_\tau=0.709$, $\hat{o}_\delta=0.379$ and $\hat{o}_\omega=0.863$.

The estimated value of $\sigma(\psi)$ from the data is:

$\hat{\sigma}(\psi)=0.119$.

Figure 6:
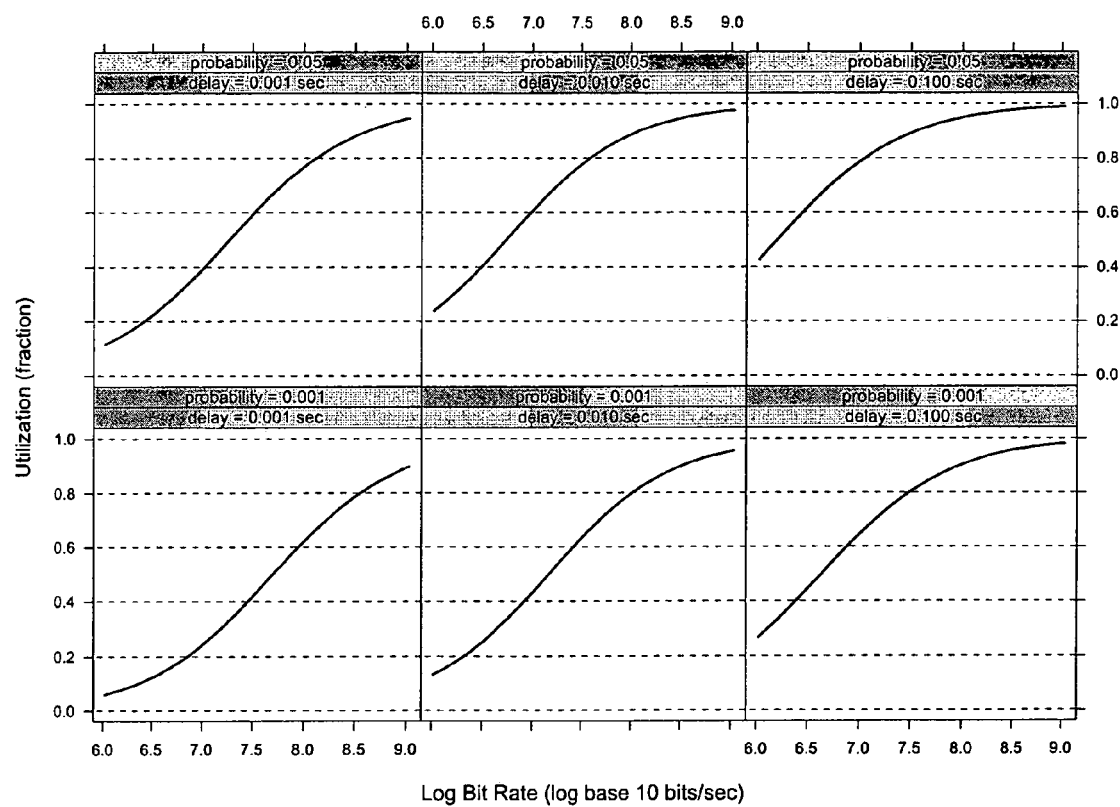
FIG. 6 shows a plot of QoS utilization for a bandwidth allocation model of the invention.

The hierarchical model here provides a model for predicting the QoS bandwidth given the delay, delay probability, and traffic bit rate. This is illustrated in FIG. 6. On each panel, the predicted utilization, u, is graphed against log bit rate ($\log_2(\tau)$) from 1 megabit/sec to 1 gigabit/sec for the values of $\delta$ and $\omega$ shown in the strip labels at the top of the panel. There are six panels: two delay probabilities—0.001 and 0.05—and three delays—0.001 sec, 0.010 sec, and 0.100 sec.

Herein, the inventors have disclosed a new and improved method for determining QoS utilization in an Internet link. Numerous modifications and alternative embodiments of the invention will be apparent to those skilled in the art in view of the foregoing description. In particular, it should be understood that, while the invention has been described in terms of best effort traffic over an Internet link, the principles of the invention will equally apply for other traffic types and other arrangements for transmitting data from a data source to a receiver.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. A method for determining a bandwidth required for meeting one or more quality-of-service ("QoS") criterion on a transmission link comprising the steps of:
   generating a plurality of streams of traffic for the transmission link;
   conducting a plurality of simulations of bandwidth for the link, based on generated traffic streams and using systematically varying values of the one or more QoS criterion;
   developing a statistical model of the transmission link based on the simulations, the statistical model specifying a bandwidth requirement for achieving at least one of the QoS criterion as a function of bandwidth, traffic load, queuing delay and packet loss, the model further specifying a link utilization (u), defined as a ratio of traffic load ($\tau$) on the link to link bandwidth ($\beta$) (u=$\tau$/$\beta$), as an algebraic function of queuing delay ($\delta$) and delay probability ($\omega$); and
   applying the developed model to determine bandwidth required to meet the one or more QoS criterion on a link.

2. The method of claim 1 wherein each of the generated traffic streams has a fixed traffic bit rate and the traffic bit rate varies from stream to stream.

3. The method of claim 1 wherein the streams of traffic are organized into packets and the traffic streams are defined by packet arrivals and sizes.

4. The method of claim 1 wherein the traffic streams are generated synthetically based on a statistical model.

5. The method of claim 4 wherein the statistical model is a Fractional Sum Difference model.

6. The method of claim 1 wherein the step of conducting plural simulations includes the sub-steps of:
   choosing a trial bandwidth for a given simulation; and
   iteratively repeating the simulation with an incremental change in the trial bandwidth until a QoS value realized for the simulation substantially matches a selected QoS criterion.

7. A method for determining a bandwidth required for meeting one or more quality-of-service ("QoS") criterion on a transmission link comprising the steps of:
   generating a plurality of streams of traffic for the transmission link;
   conducting a plurality of simulations of bandwidth for the link, based on generated traffic streams and using systematically varying values of the one or more QoS criterion;
   developing a model addressed to a relationship between bandwidth and the one or more QoS criterion based on the simulations; and
   applying the developed model to determine bandwidth required to meet the one or more QoS criterion on a link;
   wherein the developed model is of the form:

$$\log_2\left(\frac{u}{1-u}\right) = \mu + o_\delta \log_2(\delta) + o_\omega(-\log_2(-\log_2(\omega))) + \epsilon,$$

where u is the QoS utilization, $\delta$ is the queuing delay, $\omega$ is the delay probability, $\epsilon$ is a random variable with mean 0 and variance $\sigma^2$ ($\epsilon$), $\mu$ is a constant for a given traffic stream, serving as a summary of the statistical properties of the stream, and $o_\delta$ and $o_\omega$ are empirically determined constants.

8. The developed model of the form claimed in claim 7 wherein:

$o_\delta \cong 0.379$, $o_\omega \cong 0.863$ and $\sigma^2(\epsilon) \cong 0.113$.

9. The developed model of the form claimed in claim 7 wherein:

$\mu = o + o_\tau(\log_2(\tau)-24) + \xi$ where $\xi$ is a random variable with mean 0 and variance $\sigma^2(\xi)$ and o and $o_\tau$ are empirically determined constants.

10. The developed model of the form claimed in claim 9 wherein:

$o \cong 5.500$, $o_\tau \cong 0.709$ and $\sigma^2(\xi) \cong 0.036$.

11. A method for determining a bandwidth required for meeting one or more quality-of-service ("QoS") criterion on a transmission link comprising the steps of:
   generating a plurality of streams of traffic for the transmission link;
   conducting a plurality of simulations of bandwidth for the link, based on generated traffic streams and using systematically varying values of the one or more QoS criterion;
   developing a model addressed to a relationship between bandwidth and the one or more QoS criterion based on the simulations; and
   applying the developed model to determine bandwidth required to meet the one or more QoS criterion on a link;
   wherein the developed model is of the form:

$\text{logit}_2(u) = o + o_\tau \tau + o_\delta \log_2(\delta) + o_\omega(-\log_2(-\log_2(\omega))) + \psi,$ where u is the QoS utilization, $\tau$ is the link bit rate, $\delta$ is the queuing delay, $\omega$ is the delay probability, $\psi = \epsilon + \xi$ is a normal random variable with mean 0 and variance $\sigma^2(\psi) = \sigma^2(\epsilon) + \sigma^2(\xi)$ and o, $o_\tau$, $o_\delta$ and $o_\omega$ are empirically determined constants.

12. The developed model of the form claimed in claim 11 wherein:

$o \cong 5.500$, $o_\tau \cong 0.709$, $o_\delta \cong 0.379$, $o_\omega \cong 0.863$ and $\sigma^2(\psi) \cong 0.119$.

* * * * *

UNITED STATES PATENT AND TRADEMARK OFFICE
CERTIFICATE OF CORRECTION

PATENT NO. : 7,660,706 B2
APPLICATION NO. : 10/783806
DATED : February 9, 2010
INVENTOR(S) : Cao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Fourth Day of January, 2011

David J. Kappos
*Director of the United States Patent and Trademark Office*